United States Patent
Lyon

[11] 3,714,651
[45] Jan. 30, 1973

[54] NON-COOPERATIVE COLLISION AVOIDANCE SYSTEM

[75] Inventor: Zeno G. Lyon, Scotch Plains, N.J.

[73] Assignee: International Telephone and Telegraph Corporation, Nutley, N.J.

[22] Filed: Aug. 14, 1970

[21] Appl. No.: 63,876

[52] U.S. Cl. ............ 343/9, 343/100 PE, 343/100 SA, 343/112 CA
[51] Int. Cl. ............................................... G08g 5/04
[58] Field of Search .343/9, 112 CA, 100 PE, 100 SA

[56] References Cited

UNITED STATES PATENTS

| | | | |
|---|---|---|---|
| 3,112,480 | 11/1963 | Lakatos | 343/9 |
| 3,359,555 | 12/1967 | Taylor | 343/100 PE X |

*Primary Examiner*—Benjamin A. Borchelt
*Assistant Examiner*—Richard E. Berger
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A plurality of main antenna arrays are judiciously disposed on a first aircraft to provide complete coverage of all directions a second aircraft may approach the first aircraft on a collision course. Each of the main arrays includes a pair of orthogonal line arrays. Each of the line arrays includes a plurality of pairs of orthogonal linearly polarized antenna elements. A RF pulse is transmitted from an omnidirectional antenna or from one of the line arrays of a selected main array by the antenna elements having one of the linear polarizations. Correlation detectors are coupled to both line arrays of a selected main array and are responsive to both linear polarizations of both line arrays. A summing circuit is coupled to the correlation detectors to produce a first output signal when the reflected energy of the transmitted RF pulse occurs at intersection of the beams of the first and second line arrays of the selected main array. One of the inputs to the correlation detectors is gated by the first output signal and mixed with a reference frequency signal to produce a second output signal representative of the Doppler frequency of the reflected RF signal. The first and second output signals together with the time of transmitting the RF pulse, the roll and pitch information of the aircraft sensors and the main array elevation and azimuth information are processed and provides an indication of whether the second aircraft is on a collision course with the first aircraft and, in turn, provides an indication of a pre-arranged evasive action for a pilot of the first aircraft to avoid collision with the second aircraft when a collision course is indicated. Each of the main arrays are selected in sequence for coupling to the correlation detectors and while selected the line arrays are steered electronically to provide scanning of an area in the direction the selected main array is radiating.

18 Claims, 5 Drawing Figures

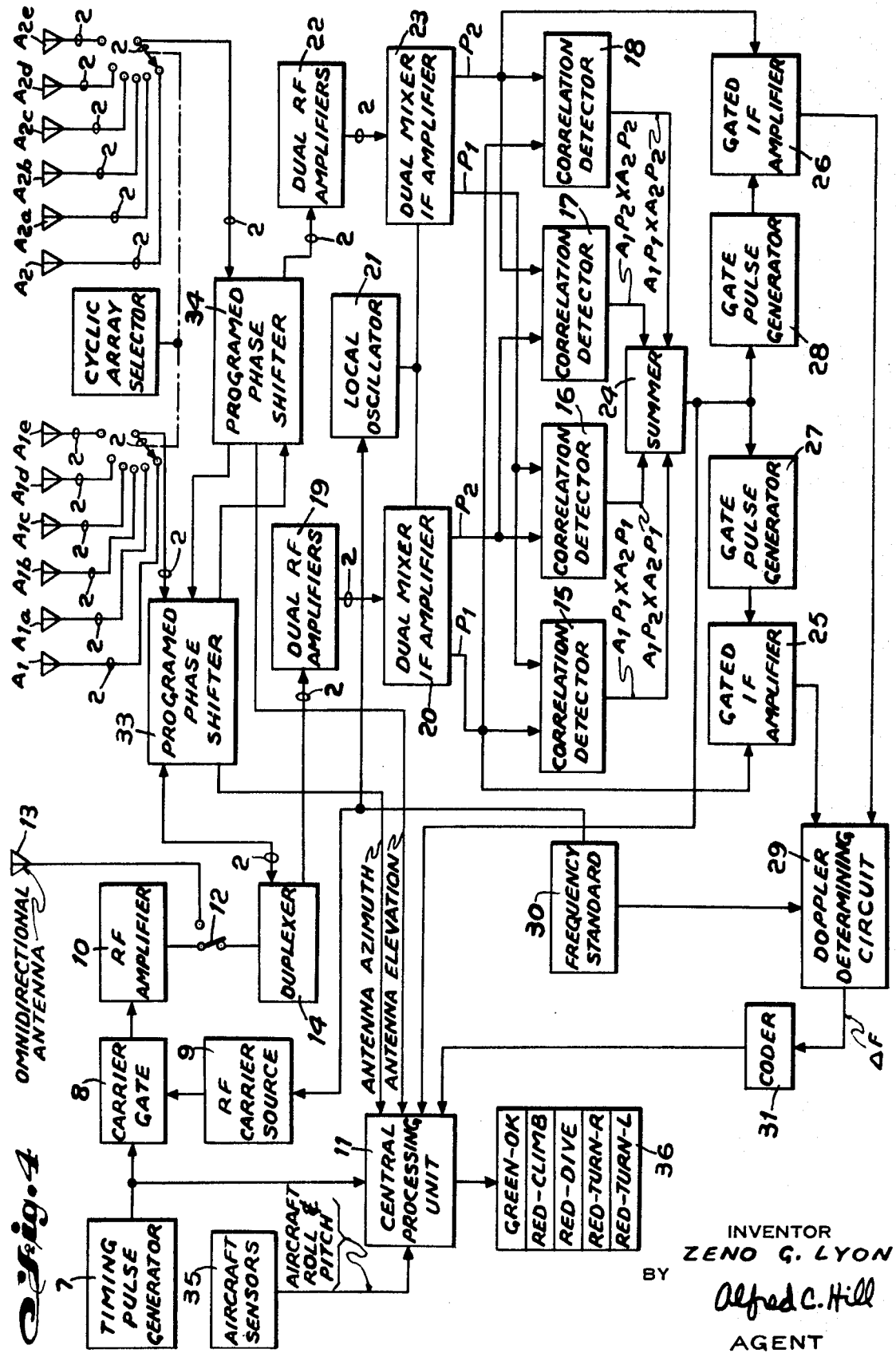

NON-COOPERATIVE COLLISION AVOIDANCE SYSTEM

BACKGROUND OF THE INVENTION

This invention relates to collision avoidance systems and more particularly to a non-cooperative collision avoidance system.

Current approaches to collision avoidance for aircraft have dispensed with non-cooperative schemes in favor of a cooperative scheme based on precisely time-synchronized fully cooperative systems and, in particular, systems employing a time-shared transponder approach which has been successfully tested.

This appears to be a viable, if costly, solution, but it offers little, if any protection for commercial aircraft from general aviation. It is safe to say that crashes between commercial and private aircraft would not be prevented by the cooperative systems because the price of the transponder necessary in the private aircraft would deny its use by general aviation.

Non-cooperative collision avoidance systems must provide radius vector, azimuth, and elevation and, preferably, range rate. To obtain all of this information, one must think in terms of radar when considering non-cooperative schemes. Radar has been rejected in the past because of insufficient aperture to provide antenna beamwidths small enough for the resolution required for determination of azimuth and elevation. In this connection, it has been, in the past, generally assumed that a pencil beam would be required. Even in X-band, this requires a circular aperture approximately 60 inches in diameter for a one degree beamwidth.

SUMMARY OF THE INVENTION

An object of the present invention is to provide an improved non-cooperative collision avoidance system of the radar type.

Another object of the present invention is to provide a non-cooperative collision avoidance system of the radar type that will overcome the hereinabove mentioned disadvantage of insufficient beamwidths.

Still another object of the present invention is to incorporate as the antenna of a non-cooperative collision avoidance system a pair of orthogonally disposed line antenna arrays.

A feature of the present invention is the provision of a non-cooperative collision avoidance system for a first aircraft comprising first means to transmit a radio frequency pulse; at least one main antenna array including a first line antenna array having a first plurality of antenna elements responsive to elliptical reflective energy, and a second line antenna array disposed orthogonal to the first line array having a second plurality of antenna elements responsive to elliptical reflective energy, said first and second line arrays receiving said elliptical reflected energy of said radio frequency pulse including two orthogonal, linear polarizations from at least one second aircraft spaced from the first aircraft; second means coupled to the first and second line arrays responsive to energy of the two linear polarizations received by both of the first and second line arrays to produce a first output signal when the reflected energy of the radio frequency pulse occurs at the intersection of the beams of the first and second line arrays; third means coupled to the second means responsive to the first output signal to produce a second output signal representing the Doppler frequency of the reflected energy of the radio frequency pulse; and fourth means coupled to at least the first means, the second means and the third means to indicate whether the second aircraft is on a collision course with the first aircraft.

Another feature of the present invention is the provision of a fifth means coupled to the above-mentioned fourth means to indicate a pre-arranged evasive action for a pilot of the first aircraft to avoid a collision when the collision course is indicated.

Still another feature of the present invention is to provide a means coupled to both the first and second line arrays of a selected main array to cooperatively steer both the first and second line arrays to scan a predetermined area in the direction the main array is radiating.

A further feature of the present invention is the provision of a plurality of the above-mentioned main arrays judiciously disposed upon the outer surface of the first aircraft to enable the first aircraft to receive an indication of the collision course with the second aircraft regardless of the direction the second aircraft approaches the first aircraft, and a means coupled to each plurality of the main array and the above-mentioned second means to cyclically select each of the plurality of the main arrays for coupling to the second means.

BRIEF DESCRIPTION OF THE DRAWING

The above-mentioned and other features and objects of this invention will become more apparent by reference to the following description taken in conjunction with the accompanying drawings, in which:

FIG. 4 is a block diagram illustrating the non-cooperative collision avoidance system utilizing a plurality of main arrays as shown in FIG. 1 in accordance with the principles of the present invention.

DESCRIPTION OF THE PREFERRED EMBODIMENT

Figure 1:
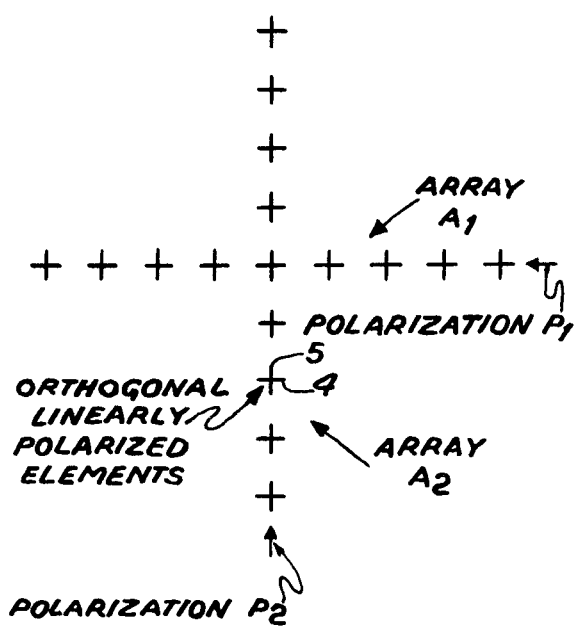
FIG. 1 is a schematic illustration of one main antenna array in accordance with the principles of the present invention.

Referring to FIG. 1, there is illustrated therein schematically a main antenna array employed with the collision avoidance system of the present invention. The main antenna array includes a horizontally disposed line antenna array A1 and a line antenna array A2 disposed orthogonally to line antenna array A1. Each of the two orthogonal line arrays include a plurality of pairs of linearly polarized antenna elements 4 and 5 disposed in an orthogonal relationship.

Figure 2:
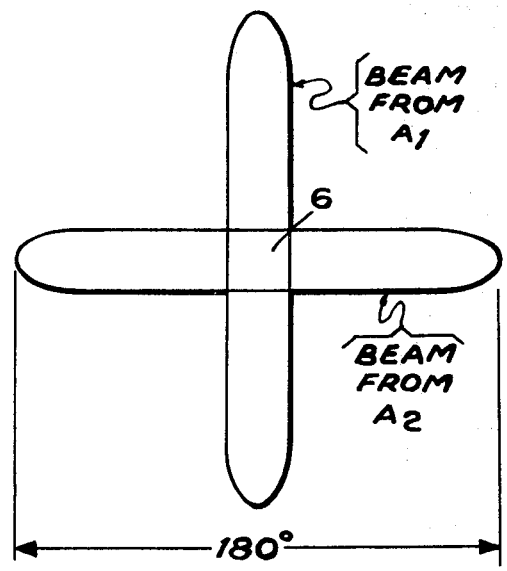
FIG. 2 is a schematic illustration of the beams provided by the line arrays of FIG. 1.

In one reduction to practice employing the configuration illustrated in FIG. 1, it has been determined that the overall length of each of the line arrays A1 and A2 for a 1 degree beam-width is approximately 5 feet at 10 gigahertz. These arrays are flush mounted and judiciously disposed on the outer surface of the aircraft carrying the system of this invention to enable this aircraft to receive an indication of a collision course with a second aircraft regardless of the direction the second aircraft approaches the first aircraft. One possible arrangement of the main antenna arrays on the aircraft is to flush mount one main array on each side of the vertical stabilizer, on the top and bottom of the fuselage, on the nose of the larger aircraft, such as the 747 and its military counterparts, as well as future large, high speed jet airliners, and, finally, on the tail of such aircraft. The beam of each line array is proposed to be electronically steerable approximately 70 degrees off normal in discrete intervals of about one-half beam-widths (± 140 steps). With both antennas directed normally, as shown in FIG. 1, beams are produced as shown in FIG. 2 wherein the two beams intersect at area 6 in a 1° × 1°, or one square degree, area.

Now referring to FIG. 4, wherein there is shown in block diagram form a complete collision avoidance system incorporating a plurality of main antenna arrays each of which includes the line arrays A1 and A2, identified for the example of location on the aircraft frame mentioned above which will require six main arrays. Thus, six A1 arrays are provided, identified in FIG. 4 as A1–A1e, and also six A2 line arrays are provided, identified as A2–A2e. The output from each of these line arrays whether it be the vertically or horizontally disposed line arrays provides two outputs, one output for one linear polarization and a second output for the orthogonally related linear polarization. The presence of two transmission lines is indicated in FIG. 4 by the circle around the line with a 2 connected thereto.

A timing pulse generator 7, carrier gate 8 which has coupled thereto an RF (radio frequency) carrier source 9 provides the RF pulse for transmission from the aircraft. The action of the pulse from generator 7 is to open gate 8 so that a pulse of RF carrier signal can be coupled to radio frequency amplifier 10. The output of generator 7 is also coupled to the central processing unit 11 and is used in conjunction with an output developed from the reflective echo of the transmitted RF pulse to provide the range to the detected sound aircraft. The processing to determine the range is a conventional process well known to those skilled in radar techniques of range determination.

If switch 12 is positioned in its up position, the RF pulse would be transmitted from an omnidirectional antenna 13 resulting in the RF pulse being transmitted in all directions from the aircraft. Another arrangement for transmitting the RF pulse necessary in radar type collision avoidance systems is to position switch 12 in the position illustrated and apply the RF pulse to duplexer 14 employed to permit the transmitter and receiver in a radar system to use a common antenna. Duplexer 14 and the transmission lines associated with the selected one of one of the line arrays of the selected main array receives the RF pulse with the RF pulse then being applied to all the dipole elements of one polarization, such as element 5 of FIG. 1 in line array A1. Thus, as each of the main antenna arrays are selected the line array A1 has its vertical antenna elements of each of the pair of orthogonally related antenna elements excited by the RF pulse for transmission in the direction the main antenna array is radiating.

Regardless of the manner in which the RF pulse is transmitted from the aircraft the echo or reflected pulse return from a complex target will be elliptically polarized, but containing therein the original linear polarization P1 produced by the transmitting antenna. Let AiPj refer to a signal on antenna Ai having polarization Pj. Then, it is possible to correlate simultaneously, as follows A1 P1 × A2 P1; A1 P2 × A2 P2; A1 P1 × A2 P2 and A1 P2 × A2 P1. That is, the P1 output of array A1 is correlated with the P1 output of line array A2, etc. as performed by correlation detectors 15, 16, 17 and 18.

Before reaching correlation detectors 15–18 the polarization signals from each of the line arrays of the selected main array are processed as follows. The output from array A1 of the selected main array is passed appropriately through duplexer 14 to the dual radio frequency amplifiers 19 and, hence, to a dual mixer-IF amplifier 20 receiving its heterodyning signal from local oscillator 21 resulting in two output signals from line array A1, one of these signals having a polarization P1 and the other of these signals having a polarization P2. The polarization output of line array A2 of the selected main array is processed through dual RF amplifiers 22 and, hence, coupled to the dual mixer-IF amplifier 23 employing as its heterodyning signal the signal of local oscillator 21. There results at the output of mixer-amplifier 23 two output signals from line array A2 having the same frequency as the output signal from mixer-amplifier 20 with a P1 polarization in one output signal and a P2 polarization in the other output signal. These outputs from mixer-amplifiers 20 and 23 are coupled as illustrated to the correlation detectors 15–18 to produce the correlated outputs from each of detectors 15–18 as shown in FIG. 4. The output from each of the detectors 15 and 18 are summed in summer 24 to produce what has been termed herein the first output signal which is indicative of the reflected RF pulse being received by the main antenna array in the intersection 6 of the beams from line arrays A1 and A2 as illustrated in FIG. 2. This correlation output is then coupled to processing unit 11 which in combination with the output of generator 7 provides the required information of the range to the aircraft detected by the selected main antenna array.

Figure 3:
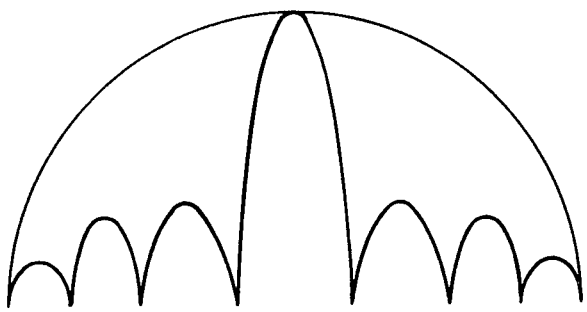
FIG. 3 illustrates the radiation pattern of line array A1 of FIG. 1 in cross section and the radiation pattern of line array A2 looking down the line array A1 of FIG. 1.

FIG. 3 illustrates the radiation pattern of A1 in cross-sections and the radiation pattern of array A2 looking down the line array A1. It should be noted that it is possible to correlate the output from a side lobe with the main beam output of the other array, giving rise to a false target. This can be controlled by keeping the side lobes low. Furthermore, the targets can be resolved, provided they are not at precisely the same range. Once resolved, various criteria can be applied and programmed into processing unit 11 to determine whether the target is a false target or a real target. This question will be discussed in greater detail hereinbelow.

The operation of that portion of the system of FIG. 4 just described is as follows. A RF pulse is transmitted, for instance, from one antenna array A1 on one polarization P2. This RF pulse strikes a target and, in being reflected, the reflected return assumes a particular time dependent characteristic as a function of amplitude, phase and frequency. The frequency shift, of course, results from the generation of Doppler, if there is a relative velocity between the two aircraft. The reflected pulse is then received by line arrays A1 and A2 contained in the selected main antenna array with a correlation co-efficient of near unity at the intersection of the beams of the two line arrays. The reflected pulses received from directions other than that determined by the intersection will be from different targets and will not be correlated, thus producing no outputs from the correlation detectors 15–18. Targets along the line determined by the intersection will presumably be separated in space and, therefore, in time and can thus be resolved.

As with standard radar, the range is determined in processing unit 11 instantaneously by the time delay between the transmitted and reflected pulses. The range rate is obtained by measuring the Doppler shift of the pulse. The output of summer 24 is no longer usable for analysis of the returned pulse. However, the pulse is present with all information associated with it at the output of IF amplifiers 20 and 23. Therefore, Doppler can be determined by coupling one output from mixer-amplifier 20 and one output from mixer-amplifier 23 to gated IF amplifiers 25 and 26, respectively. The output of summer 24 is coupled to the gate pulse generators 27 and 28 coupled respectively to gate amplifiers 25 and 26. The gated output signal of amplifiers 25 and 26 contain the Doppler $\Delta F$ and are coupled to Doppler determining circuit 29. Circuit 29 includes therein a circuit to average the output signals from amplifiers 25 and 26 to obtain the best estimate of Doppler $\Delta F$ present in these two output signals. The Doppler $\Delta F$ is recovered by comparing the output of the averaging circuit with a frequency reference output signal from frequency standard 30. To insure that true Doppler is recovered an output signal from frequency standard 30 is employed by source 9 and oscillator 21 to derive their appropriate output signals, through frequency multiplication and/or division; which will be synchronous with respect to each other and the frequency reference output signal from standard 30. Standard 30 can be any conventional frequency standard, for instance, a highly stable crystal controlled oscillator.

The Doppler $\Delta F$ output of circuit 29 is quantized such as by coder 31 to place the recovered Doppler in a form suitable for use in central processing unit (computer) 11 so that the rate of range change can be determined and used as one criteria of determining a collision course between the two aircraft.

Now that the range and range rate have been determined, it is necessary to determine the solid angle determined by the elevation and azimuth angles of the selected main antenna to a target. This can be provided by the output of a programmed phase shifter 33 and 34 associated with array A1 and array A2 of the selected main antenna array. Phase shifters 33 and 34 cooperate in a programmed manner to scan the two orthogonal line arrays by phase steering of the two line arrays of the selected main array. For example, the beam from array A1 of FIG. 2 is held stationary, while the beam from array A2 is moved in one-half to one beam-width steps through its complete range of beam positions. The array A1 is then moved one beam position to another beam position while the line array A2 again scans. Prior to each of these scanning operations of the course of completing the full scan, the RF pulse is transmitted from array A1 in its new indexed position. It is estimated that a complete spherical search scan to one hundred miles range will require about 3 seconds.

To obtain the solid angle to a target as derived from the antenna azimuth and antenna elevation, the processing unit 11 must receive therein a compensating indication of the roll and pitch of the aircraft so that the reference plane is always fixed relative to the center of the earth, regardless of the attitude of the aircraft. This must be done to obtain the true direction to the target. This information for central processing unit 11 is provided by aircraft sensors 35.

With central processing unit 11 having the information applied to it discussed hereinabove, it is possible for unit 11 to provide an indication of whether or not the aircraft carrying the system of this invention is in a collision course with the detected aircraft. This indication may be provided in an easy readout for the pilot of the aircraft carrying this system, such as indicated at readout panel 36 wherein a green light is lit to indicate that the target is not on a collision course with any other aircraft involved, or a red light if there is a collision course between another and own aircraft indicated by processing unit 11. In addition, the readout panel 36 may include therein, a pre-arranged evasive action for the pilot to carry out in the aircraft carrying the system of this invention to avoid the collision. For instance, unit 11 may determine from the angle and range of the collision course that the best maneuver is to climb, or that it is to dive, or that a right turn is necessary, or that a left turn is necessary to avoid the collisions. This can be provided in read out panel 36, as directed by unit 11, so that the pilot of the aircraft carrying the system of this invention would immediately know the best possible evasive action to take to avoid an imminent collision with a detected target.

Figure 5:
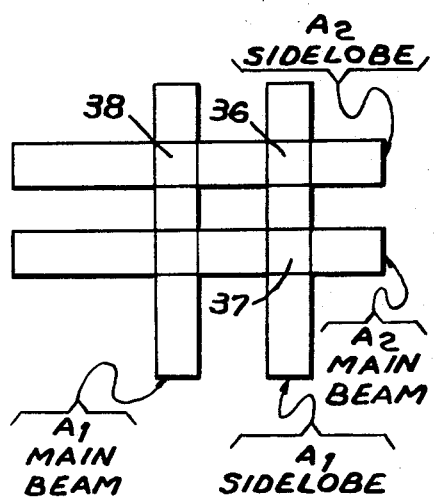
FIG. 5 is a schematic illustration useful in explaining how intersections of the main beam of one of the line arrays with the side lobe of the other of the line arrays is resolved.

As mentioned hereinabove, side lobe levels must be controlled. When a pulse is transmitted, it will emanate into space in the main beam direction and in the side lobe directions, although at reduced level. If it illuminates a target in a side lobe direction, a return will be received on the same side lobe (at reduced level again). The received echo will be reduced by twice the side lobe level relative to that received when the target is illuminated by the main beam or beams. This is illustrated in FIG. 5. Suppose both line array A1 and A2 side lobes are maintained at −20 db (decibels). Then when the intersection of the side lobe beam at area 36 receives a return it is −40 db relative to the signal when the main beam is pointed to the same target. Alternatively, two targets at the same range must have radar cross-sections differing by 40 db in order to appear at the same signal strength in both the main beam and the side beam. A return is also obtained from a combination main and side beam, such as indicated by intersecting areas 37 and 38. Here the reduction is only 20 db. As stated before, the false target obtained by way of a side lobe can be resolved unless it is within 1,000 feet, or less, of the same range as the target in the main beam, for a 2 microsecond pulse width. Shorter pulse widths allow resolution of correspondently smaller separations. In any case, the range and the range rate obtained for the false target are correct. Furthermore, the actual target (which gives rise to the false target) also appears at the proper solid angle bearing. To eliminate the false target, it is necessary to perform some analysis to show its identity with the actual target. Identical Doppler shifts (range rates) would be an excellent clue for a start. If a false target appears at precisely the same range as a target in the main beam, it should be masked because of the 20 to 40 db disparity that should be available with good array design. Should it not be, but rather, the main beam target and the false target appear at the same range and have the same received signal strength, than the odds favor a different Doppler shift. This will give rise to two different Doppler frequencies $\Delta F$ in FIG. 4.

Thus, although false targets still appear, they are generated only by real targets, and they will almost always be resolved in time (space) and can be investigated to identify them with the real targets.

While I have described above the principles of my invention in connection with specific apparatus, it is to be clearly understood that this description is made only by way of example and not as a limitation to the scope of my invention as set forth in the objects thereof and in the accompanying claims.

I claim:

1. A non-cooperative collision avoidance system for a first aircraft comprising:
    first means to transmit a radio frequency pulse;
    at least one main antenna array including
        a first line antenna array having
            a first plurality of antenna elements responsive to elliptical reflected energy, and
        a second line antenna array disposed orthogonal to said first line array having
            a second plurality of antenna elements responsive to elliptical reflected energy,
        said first and second line arrays receiving said elliptical reflected energy of said radio frequency pulse including two orthogonal, linear polarizations from at least one second aircraft spaced from said first aircraft;
    second means coupled to said first and second line arrays responsive to energy of said two linear polarizations received by both of said first and second line arrays to produce a first output signal when said reflected energy of said radio frequency pulse occurs at the intersection of the beams of said first and second line arrays;
    third means coupled to said second means responsive to said first output signal to produce a second output signal representing the Doppler frequency of said reflected energy of said radio frequency pulse;
    fourth means coupled to at least said first means, said second means and said third means to indicate whether said second aircraft is on a collision course with said first aircraft; and
    fifth means coupled to both said first and second line arrays to cooperatively steer both said first and second line arrays to scan a predetermined area in the direction said main array is radiating.

2. A system according to claim 1, further including fifth means coupled to said fourth means to indicate a prearranged evasive action for a pilot of said first aircraft to avoid a collision when said collision course is indicated.

3. A system according to claim 1, further including roll and pitch sensors of said first aircraft coupled to said fourth means.

4. A system according to claim 1, wherein each of said line arrays includes
    a plurality of a pair of orthogonally disposed linearly polarized antenna elements.

5. A system according to claim 1, wherein said second means includes
    correlation means coupled to both said first and second line arrays responsive to both of said two linear polarizations, and
    summing means coupled to the output of said correlation means to produce said first output signal.

6. A system according to claim 1, wherein said second means includes
    a first correlator coupled to said first and second line arrays responsive to one of said two linear polarizations of both said first and second line arrays,
    a second correlator coupled to said first and second line arrays responsive to the other of said two linear polarizations of both said first and second line arrays,
    a third correlator coupled to said first and second line arrays responsive to said one of said two linear polarizations of one of said first and second line arrays and said other of said two linear polarizations of the other of said first and second line arrays,
    a fourth correlator coupled to said first and second line arrays responsive to said one of said two linear polarizations of said other of said first and second line arrays and said other of said two linear polarizations of said one of said first and second line arrays, and
    a summing circuit coupled to the output of each of said first, second, third and fourth correlators to produce said first output signal.

7. A system according to claim 1, wherein said third means includes
    a gated means coupled to the input of said second means and the output of said second means to gate the energy of one of said two linear polarizations of one of said first and second line arrays to the output of said gated means by said first output signal,
    a reference frequency source, and
    fourth means coupled to the output of said gated means and said source to produce said second output signal.

8. A system according to claim 1, wherein said first means includes
    an omnidirectional antenna.

9. A system according to claim 1, wherein said first means is coupled to one of said first and second line arrays for transmission of said radio frequency pulse having one of said two linear polarizations.

10. A non-cooperative collision avoidance system for a first aircraft comprising:
    first means to transmit a radio frequency pulse;
    at least one main antenna array including a first line antenna array having
  a first plurality of antenna elements responsive to elliptical reflected energy, and
  a second line antenna array disposed orthogonal to said first line array having
    a second plurality of antenna elements responsive to elliptical reflected energy,
  said first and second line arrays receiving said elliptical reflected energy of said radio frequency pulse including two orthogonal, linear polarizations from at least one second aircraft spaced from said first aircraft;
second means coupled to said first and second line arrays responsive to energy of said two linear polarizations received by both of said first and second line arrays to produce a first output signal when said reflected energy of said radio frequency pulse occurs at the intersection of the beams of said first and second line arrays;
third means coupled to said second means responsive to said first output signal to produce a second output signal representing the Doppler frequency of said reflected energy of said radio frequency pulse; and
fourth means coupled to at least said first means, said second means and said third means to indicate whether said second aircraft is on a collision course with said first aircraft further including
a plurality of said main array judiciously disposed upon the outer surface of said first aircraft to enable said first aircraft to receive an indication of said collision course with said second aircraft regardless of the direction said second aircraft approaches said first aircraft; and
fifth means coupled to each of said plurality of said main array and said second means to cyclically select each of said plurality of said main array for coupling to said second means.

11. A system according to claim 10, further including
sixth means coupled to said fourth means to indicate a pre-arranged evasive procedure for a pilot of said first aircraft to avoid a collision when said collision course is indicated.

12. A system according to claim 11, further including
roll and pitch sensors of said first aircraft coupled to said fourth means.

13. A system according to claim 12, wherein
each of said line arrays of said plurality of said main array includes
a plurality of a pair of orthogonally disposed linearly polarized antenna elements.

14. A system according to claim 13, wherein
said second means includes
correlation means coupled to both said first and second line arrays of the selected one of said plurality of said main array responsive to both of said two linear polarizations, and
summing means coupled to the output of said correlation means to produce said first input signal.

15. A system according to claim 14, wherein
said third means includes
a gated means coupled to the input of said correlation means and the output of said summing means to gate the energy of one of said two linear polarizations of one of said first and second line arrays of said selected one of said main arrays to the output of said gated means by said first output signal,
a reference frequency source, and
seventh means coupled to the output of said gated means and said source to produce said second output signal.

16. A system according to claim 15, further including
seventh means coupled to both said first and second line arrays of said selected one of said plurality of said main array to cooperatively steer said first and second line arrays of said selected one of said plurality of said main array to scan a predetermined area in the direction said selected one of said plurality of said main array is radiating.

17. A system according to claim 16, wherein
said first means includes
an omnidirectional antenna.

18. A system according to claim 15, wherein
said first means is coupled to one of said first and second line arrays of said selected one of said plurality of said main array for transmission of said radio frequency pulse having one of said two linear polarizations.

* * * * *